Patented Jan. 6, 1953

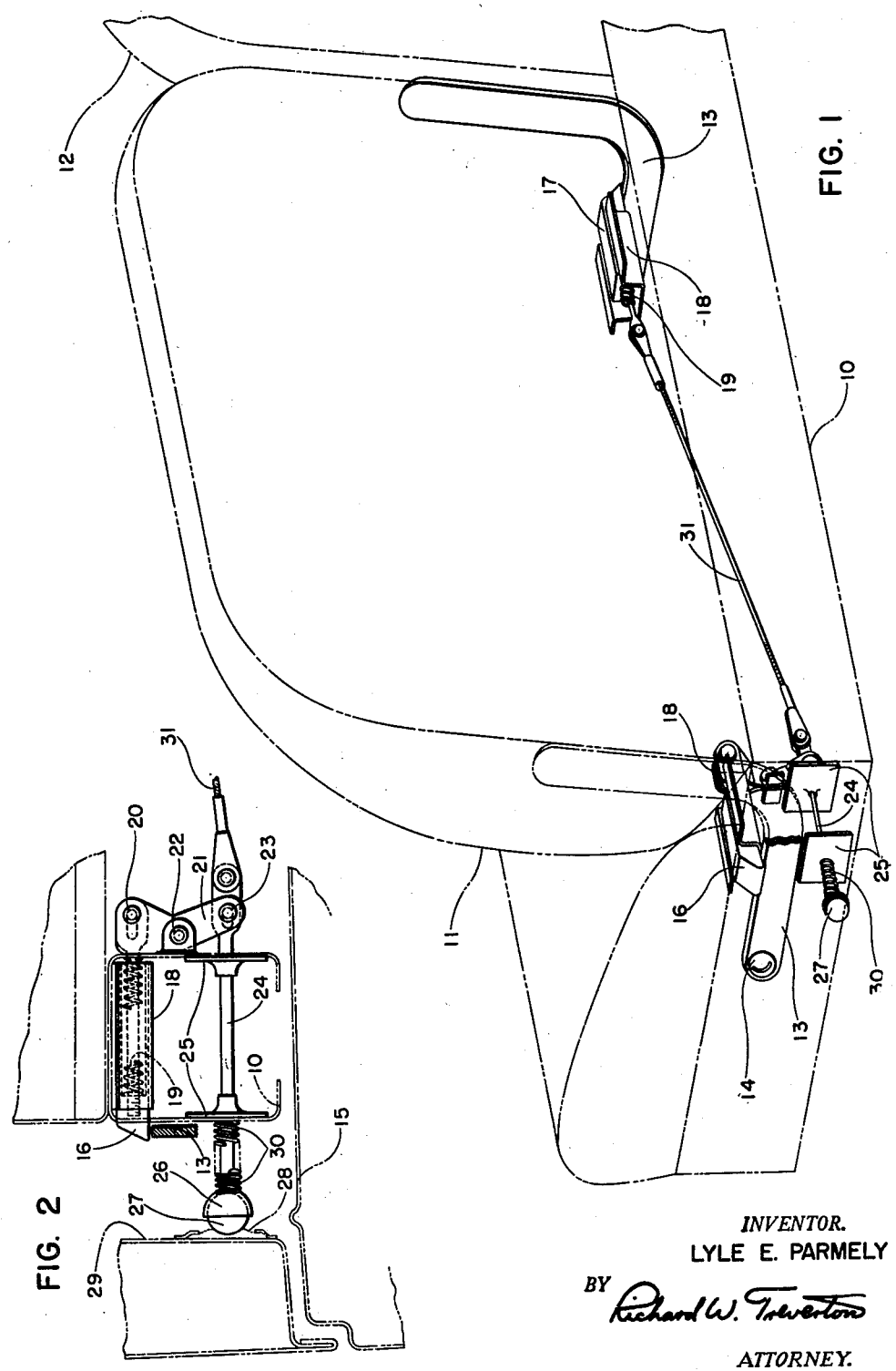

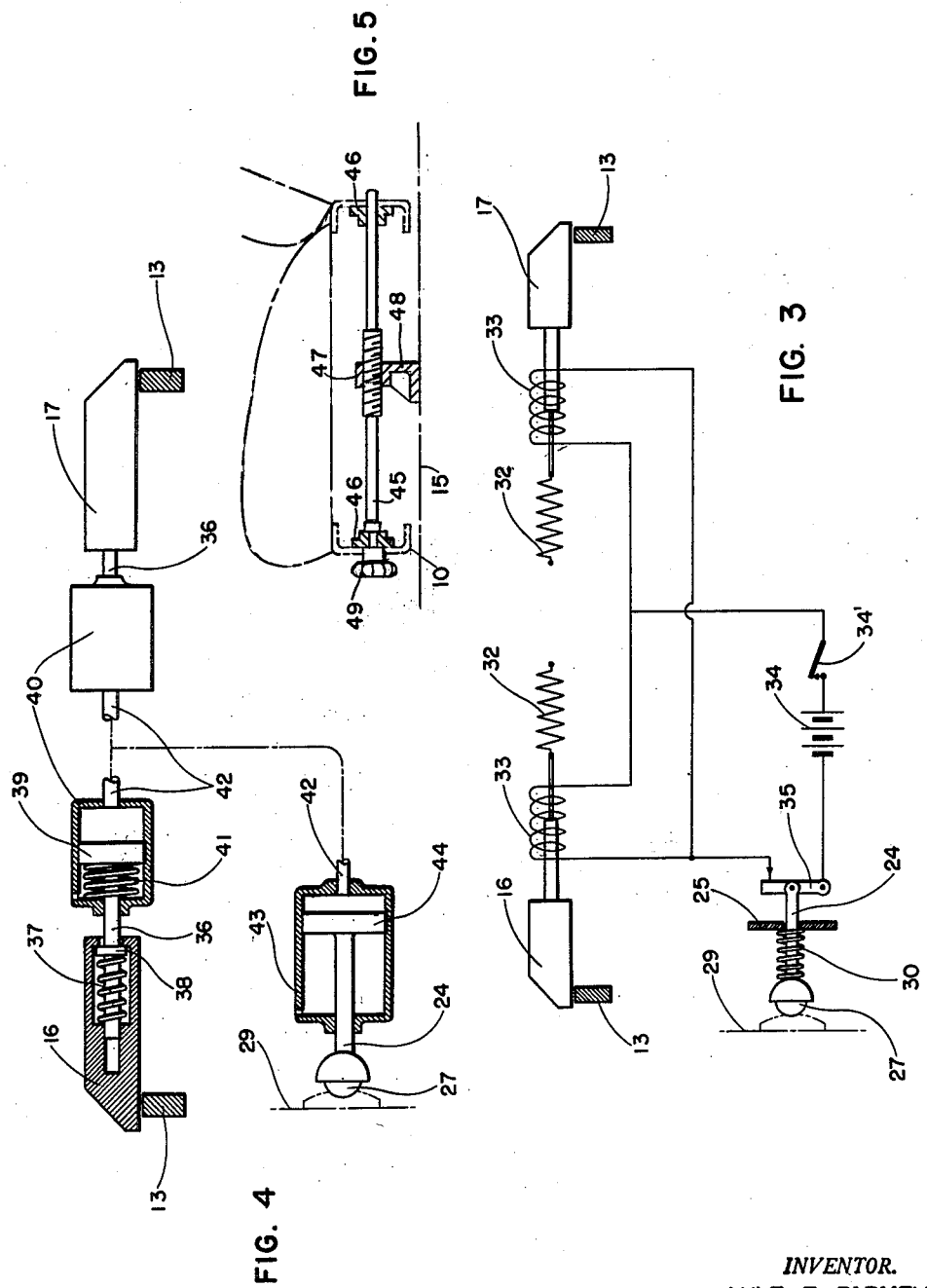

2,624,613

UNITED STATES PATENT OFFICE 2,624,613

AUTOMOBILE SEAT LOCK

Lyle E. Parmely, Columbus, Ohio

Application February 19, 1949, Serial No. 77,353

9 Claims. (Cl. 296—65)

This invention relates to an improvement in means for locking the folding front seats of passenger automobiles.

In automobiles having doors adjacent the front seats only, such as conventional two-door sedans, these seats or at least the backs thereof fold forwardly to allow occupants of the rear seats to enter and leave the vehicle. This arrangement, while advantageous in several respects, exposes occupants to greater risk of bodily injury than does a vehicle with a non-folding front seat in cases of rapid decelerations, such as in a collision or even when the brakes are suddenly and heavily applied. In the presence of high deceleration forces the folding front seats allow the rear seat occupants to be dashed against the occupants of the front seats or against the windshield, instrument panel or other forward wall portion of the passenger compartment.

It is the object of the present invention to protect the occupants by providing means which lock the front seats against folding at all times except when passengers are entering or leaving, i. e. at all times except when the adjacent door is open; the locking means being entirely automatic in operation so as to require no attention whatever from either the driver or passengers in the automobile. With the lock applied the occupants are protected to a substantial degree by the back of the front seat which is almost invariably so constructed that it will yield enough to materially soften any impact therewith of a rear seat occupant and even in the case of violent deceleration will usually prevent him from being thrown into the forward part of the vehicle interior.

According to the invention the locking means include a release element arranged in the path of the adjacent door, in such manner that the lock is released when the door is opened and so that the lock release mechanism is held inoperative whenever the door is closed. Preferably the locking means are so arranged as to be applied automatically, at any time while the release mechanism is being held inoperative, when the seat is swung rearwardly to its normal position.

The lock release mechanism may be operated either mechanically, electrically or hydraulically. In case of a mechanical system where the front seats are adjustable fore and aft it is preferred that the release element be carried by the base of the seat so as to be engageable with the door in any position of seat adjustment. With electrical or hydraulic systems this matter is of less importance since electric wires or hydraulic lines may easily be made flexible enough to provide for the fore and aft adjustment of the seat.

The foregoing and other objects and advantages will become apparent from the following description of the typical embodiments of the invention shown in the drawings wherein:

Figure 1 is a perspective view of locking means with mechanical release applied to the folding seat shown in broken lines;

Figure 2 is a rear elevational view of a part of the lock and lock release mechanism shown in Figure 1;

Figures 3 and 4 are diagrammatic views showing alternate forms of locking means respectively having electrical release means and hydraulic release means and Fig. 5 is a sectional view illustrating a means to adjust the seat fore and aft.

As shown in Figures 1 and 2, the front seat of the vehicle has a base 10 and hinged backs 11 and 12, the backs each having rigidly secured to the opposite sides thereof arms 13 which are pivoted at 14 to the base. The latter is secured to the floor 15 of the vehicle and is adjustable in a fore and aft direction to accommodate drivers of different leg length. The backs 11 and 12 may be folded forwardly, swinging in a counterclockwise direction about pivots 14, as the parts appear in Figure 1, to provide passenger access to and from the rear seat of the vehicle (not shown) when the adjacent door is open.

The application of the present invention to only the left side of the seat, having back 11, is shown in the drawings; and it will be understood that the application to the right side of the seat and the back 12 thereof may be similar but of opposite hand. As shown, a latch 16 is arranged to engage the outer arm 13 of back 11 and a similar latch 17 to engage the inner arm 13. Each latch is mounted to slide, into and from locking engagement with the associated arm, in a guide way 18 that is secured to the seat base 10. A spring 19 is arranged to act between each guide way and its latch, to urge the latter into locking relation with the associated arm; and the outer face of the latch is beveled so that as the seat is moved from folded position the latch may be cammed inwardly by the arm to allow the latter to enter into the locked condition shown in Figs. 1 and 2.

Pivoted to latch 16 by a pin and slot play connection 20 is a lever 21 which is pivoted at 22 to the base 10. The lower end of the lever is pivoted at 23 to a rod 24 which is mounted for axial motion in supports 25 secured to base 10. To the outer end of rod 24 is secured a cup 26 rotatably supporting a ball 27 for engagement with a strip 28, preferably formed of rubber or the like, which extends along the bottom of the left door 29 of the automobile. The strip should be long enough so that it will engage ball 27 when the door is closed, irrespective of the position of fore and aft adjustment of the seat base 10. A compression spring 30 serves to move the rod 24 outwardly, to the left as the parts appear in Fig. 2, when the door is opened. A cable 31 is extended from rod 24 to the inner end of latch 17.

When the left door 29 of the automobile is closed, retaining the rod 24 and lever 21 in the position shown in Fig. 2, the springs 19 hold the latches 16 and 17 extended, thereby locking the arms 13 and back 11 against forward pivotal or folding movement. When the door 29 is opened the spring 30, which is strong enough to overcome the springs 19, moves rod 24 to the right and thereby acts to retract both latches, so that the back 11 may be swung forwardly about pivots 14 to allow passengers to enter or leave the back seat of the automobile. When the door is closed the parts will again immediately return to the locked condition shown in Fig. 2, unless the door is closed while the back 11 remains folded forwardly so that arms 13 are disposed above the latches. In this case the back will automatically lock as soon as it is moved to its normal upright position, the arms 13 as they lower camming the latches inwardly to enable them to pass to their locked position beneath the latches.

In the form of the invention shown diagrammatically in Fig. 3 the latches 16 and 17 are normally held retracted by tension springs 32 which are anchored to the base of the seat; and the latches are moved into locking engagement with arms 13, as shown, by solenoids 33 when the windings of the latter are energized by an electric current from the battery 34 or other source of electricity. Preferably the solenoid windings are supported by the seat base while the solenoid armatures move with the latches. The circuit through the solenoid windings is controlled by a switch 35 that is operated by rod 24. In the condition illustrated, the rod has been moved to the right by the closing of door 29 to close switch 35. When the door is opened, the spring 30 moves the rod to the left, opening the switch 35 and thereby de-energizing the solenoids and allowing springs 32 to retract the latches from engagement with arms 13. A switch 34' in the battery circuit may be arranged to operate with the engine ignition switch of the automobile, so that battery current will not be used when the car is not being operated.

In the form of the invention shown diagrammatically in Fig. 4 each of latches 16 and 17 has a sliding play connection with a rod 36, with a compression spring 37 arranged to act between a collar 38 on the rod and the latch to hold the latter extended into locking engagement above arm 13. On the inner end of each rod is a piston 39 slidable within a cylinder 40 that is mounted on the base of the seat. A compression spring 41 within each cylinder urges the piston in a direction to release the latch. The inner ends of two cylinders are connected by a hydraulic line 42 that extends to a control cylinder 43. The latter may be mounted either upon the base of the seat or upon the floor 15. Within the cylinder 43 is a piston 44 that is secured to the inner end of rod 24, which, as in the embodiments shown in Figs. 1 to 3, inclusive, is moved to its limit position to the right by and upon closing of door 29. The line 42 and the ends of the cylinders communicating therewith are filled with hydraulic fluid, so that when piston 44 is in the position shown, the pistons 39 are held in the positions thereof in which springs 41 are compressed and the latches 16 and 17 are in locking position. However when the door 29 is opened the springs 41 move the pistons 39 inwardly, releasing latches 16 and 17, and forcing hydraulic fluid from the cylinders 40 through line 42 into cylinder 43, thereby moving piston 44 outwardly. When the door 29 is again closed the reverse action of course takes place. It will be noted that the springs 37 permit the latches 16 and 17 to be cammed inwardly by the arms 13 should the seat back be in its forwardly folded position when the door is closed and subsequently be moved to its normal upright position.

The base 10 of the seat may be adjustable fore and aft of the vehicle by any suitable means, and the details of such means form no part of the present invention. However, in Figure 5 one device which may be used for this purpose is shown. It comprises a rod 45 journaled for rotation in bearings 46 that are secured to the base 10. The rod is screw threaded to a nut 47 that is a part of a bracket 48 secured to the floor 15 of the vehicle. The adjustment is effected by manually rotating the rod, by means of a knob 49 secured to the forward end thereof.

It will be understood that the embodiments shown and described herein are set forth by way of example to illustrate the inventive principles involved, and not by way of limitation, there being no purpose to limit the scope of the invention, or the application thereof to various vehicle seat arrangements, except as may be specifically required by the appended claims.

I claim as my invention:

1. In a vehicle having a door and a seat adjacent thereto, the base of the seat being adjustable fore and aft, and the back of the seat being foldable forwardly on the base to provide access to and from a compartment aft of the seat, the combination with said vehicle comprising: a latch effective between the base and the back for holding the back against forward folding movement upon the base, a first resilient element for urging the latch into the operative position thereof, a member mounted on the base for inward and outward movement with respect to the vehicle interior, said member having a play connection with the latch for effecting movement of the latter from its operative position upon outward movement of the member and said play connection permitting rearward unfolding movement of the back when the member has been moved inwardly, a second resilient element for moving said member outwardly against the resistance of the first resilient element to effect release of the latch when the door is opened, and the door having a strip engageable with the member for moving the latter inwardly when the door is closed to provide for movement of the latch into its operative position, and said strip being elongated to so engage the member in any position of fore and aft adjustment of the base.

2. In a vehicle having a door and a seat adjacent thereto, the back of the seat being foldable forwardly on the base thereof to provide access to and from a compartment aft of the seat, the combination with said vehicle comprising: a latch effective between the base and the back for holding the back against forward folding movement upon the base, a first resilient element for urging the latch into the operative position thereof, a member mounted on the base for inward and outward movement with respect to the vehicle interior, said member having a play connection with the latch for effecting movement of the latter from its operative position upon outward movement of the member, a second resilient element for moving said member outwardly against the resistance of the first resilient element to effect release of the latch when the door is opened, and the door being engageable with the member for moving the latter inwardly when the door is closed to permit movement of the latch into its operative position.

3. In a vehicle having a door and a seat adjacent thereto, the base of the seat being adjustable fore and aft, and the back of the seat being foldable forwardly on the base to provide access to and from a compartment aft of the seat, the combination with said vehicle comprising: a latch effective between the base and the back for holding the back against folding movement upon the base, a member mounted on the base for inward and outward movement with respect to the vehicle interior, said member having a connection with the latch for effecting movement of the latter from its operative position upon outward movement of the member, a resilient element for moving said member outwardly to effect release of the latch when the door is opened, and the door being engageable with the member for moving the latter inwardly when the door is closed to permit movement of the latch into its operative position.

4. In a vehicle having a door and a seat adjacent thereto, the base of the seat being adjustable fore and aft, and the back of the seat being foldable forwardly on the base to provide access to and from a compartment aft of the seat, the combination with said vehicle comprising: a latch effective between the base and the back for holding the back against folding movement upon the base, a member mounted on the base for inward and outward movement with respect to the vehicle interior, said member having a connection with the latch for effecting movement of the latter from its operative position upon outward movement of the member, means for moving said member outwardly to effect release of the latch when the door is opened, and the door being engageable with the member for moving the latter inwardly when the door is closed to permit movement of the latch into its operative position.

5. In a vehicle having a door and a seat adjacent thereto, the back of the seat being foldable forwardly on the base thereof to provide access to and from a compartment aft of the seat, the combination with said vehicle comprising: a latch effective between the base and the back for holding the back against folding movement upon the base, a first resilient element for urging the latch into the operative position thereof, a hydraulically operated element for retracting the latch, a member mounted for inward and outward movement with respect to the vehicle interior, a hydraulic unit connected hydraulically with said element and mechanically connected with said member for effecting movement of the latch from its operative position upon outward movement of the member, a second resilient element for moving said member outwardly against the resistance of the first resilient element to effect release of the latch when the door is opened, and the door being engageable with the member for moving the latter inwardly when the door is closed to permit movement of the latch into its operative position.

6. In a vehicle having a door and a seat adjacent thereto, the back of the seat being foldable forwardly on the base thereof to provide access to and from a compartment aft of the seat, the combination with said vehicle comprising: a latch effective between the base and the back for holding the back against folding movement upon the base, an electric solenoid device acting when energized to urge the latch into the operative position thereof, a first resilient element to retract the latch when the solenoid is de-energized, a member mounted for inward and outward movement with respect to the vehicle interior, switch means in electric circuit with the solenoid, said switch means being related to said member to be opened for de-energizing the solenoid upon outward movement of the member, a second resilient element for moving said member outwardly when the door is opened, and the door being engageable with the member for moving the latter inwardly to close said switch means when the door is closed, to thereby permit movement of the latch into its operative position.

7. In a vehicle having a door and seat adjacent thereto, at least a portion of the seat being hinged for forward movement to provide access through the doorway to and from a compartment aft of said seat, the combination with said vehicle of a latch effective between the seat proper and the movable portion of the seat for holding said movable portion against such forward movement, and means operable by and upon opening movement of the door for releasing the latch, said means including a first hydraulic unit connected to the latch, and a second hydraulic unit operable by and upon movement of the door, and said units being hydraulically connected to provide for the transmission of motion between the door and the latch.

8. In a vehicle having a door and seat adjacent thereto, at least a portion of the seat being hinged for forward movement to provide access through the doorway to and from a compartment aft of said seat, the combination with said vehicle of a latch effective between the seat proper and the movable portion of the seat for holding said movable portion against such forward movement, and means operable by and upon opening movement of the door for releasing the latch, said means comprising an electric solenoid for operating the latch and a switch for controlling the solenoid operated by said door.

9. In a vehicle having a side door and a seat adjacent the door, the base of the seat being adjustable upon the vehicle proper in a fore-and-aft direction, and the back of the seat being hinged to the base for being folded forwardly on the latter to provide access to and from a compartment aft of the seat, the combination with such vehicle of means for holding said back against such forward folding while the door is closed, said means comprising an element carried by the door and a cooperating element carried by the seat, said elements being engaged to effect the aforementioned holding action when the door is closed and being disengaged when the door is open, and one of said elements being elongated in said fore-and-aft direction whereby it is engageable with the other of said elements in any position of such fore-and-aft adjustment of the seat.

LYLE E. PARMELY.

REFERENCES CITED

The following references are of record in the file of this patent:

UNITED STATES PATENTS

| Number | Name | Date |
| --- | --- | --- |
| Re. 17,680 | Smelker | May 29, 1930 |
| 1,942,070 | Smelker | Jan. 2, 1934 |
| 2,266,200 | Hedley | Dec. 16, 1941 |
| 2,299,773 | Veyder | Oct. 27, 1942 |
| 2,559,548 | Seigneur | July 3, 1951 |